United States Patent
Han et al.

(10) Patent No.: US 12,421,160 B2
(45) Date of Patent: Sep. 23, 2025

(54) LOW-EXPANSION BOROSILICATE TRANSPARENT GLAZE AND A PREPARATION METHOD AND USE THEREOF

(71) Applicants: ZHEJIANG UNIVERSITY, Hangzhou (CN); Hangzhou Grand Canal Comprehensive Protection Development and Construction Group Co., Ltd., Hangzhou (CN)

(72) Inventors: Gaorong Han, Hangzhou (CN); Yijian Wang, Hangzhou (CN); Xuebo Li, Hangzhou (CN); Yong Liu, Hangzhou (CN); Junbo Liu, Hangzhou (CN); Bentao Zhang, Hangzhou (CN); Li Li, Hangzhou (CN); Shaobo Gu, Hangzhou (CN); Lin Li, Hangzhou (CN); Dongshen Zhou, Hangzhou (CN)

(73) Assignees: ZHEJIANG UNIVERSITY, Hangzhou (CN); HANGZHOU GRAND CANAL COMPREHENSIVE PROTECTION DEVELOPMENT AND CONSTRUCTION GROUP CO., LTD., Hangzhou (CN)

( * ) Notice: Subject to any disclaimer, the term of this patent is extended or adjusted under 35 U.S.C. 154(b) by 0 days.

(21) Appl. No.: 18/728,889

(22) PCT Filed: Dec. 26, 2022

(86) PCT No.: PCT/CN2022/141919
§ 371 (c)(1),
(2) Date: Jul. 14, 2024

(87) PCT Pub. No.: WO2023/134432
PCT Pub. Date: Jul. 20, 2023

(65) Prior Publication Data
US 2025/0002396 A1    Jan. 2, 2025

(30) Foreign Application Priority Data

Jan. 13, 2022   (CN) .......................... 202210034882.8

(51) Int. Cl.
*C03C 3/093*   (2006.01)
*C03B 19/02*   (2006.01)
*C03B 25/02*   (2006.01)

(52) U.S. Cl.
CPC .............. *C03C 3/093* (2013.01); *C03B 19/02* (2013.01); *C03B 25/02* (2013.01)

(58) Field of Classification Search
None
See application file for complete search history.

(56) References Cited

U.S. PATENT DOCUMENTS

| 5,547,904 A | * | 8/1996 | Watzke ................... C03C 3/091 |
| | | | 501/905 |
| 2017/0283302 A1* | | 10/2017 | Choju .................. C03C 3/091 |
| 2019/0002329 A1* | | 1/2019 | Maschmeyer .......... C03B 29/12 |

FOREIGN PATENT DOCUMENTS

| CN | 1592722 | 3/2005 |
| CN | 1803683 | 7/2006 |

(Continued)

*Primary Examiner* — Lisa L Herring
(74) *Attorney, Agent, or Firm* — Jiwen Chen; Joywin IP Law PLLC

(57) ABSTRACT

Disclosed is a low-expansion borosilicate transparent glaze, a preparation method thereof, and use thereof in preparation of a glaze product by secondary fusion-cast molding. The low-expansion borosilicate transparent glaze has raw material composition by mass percentage including: 72%-80% of $SiO_2$, 4%-12% of $B_2O_3$, 4%-12% of $Na_2O$, 0.1%-4% of CaO, 0.1%-6% of $Al_2O_3$, 0-0.05% of $Fe_2O_3$, 0-2% of MgO, 0-2% of $K_2O$, 0-2% of ZnO, 0-2% of BaO, 0-2% of $ZrO_2$, 0-0.5% of $Li_2O$, and 0-0.5% of $TiO_2$, wherein a sum of mass percentages of $SiO_2$, $B_2O_3$ and $Al_2O_3$ is 85%-95%. The (Continued)

preparation method includes steps of: (1) after mixing dried raw materials, melting at 1400-1540° C. to obtain a high-temperature glass melt; (2) cooling the high-temperature glass melt to 1150-1230° C. to mold; and (3) annealing a molded glass at 530-600° C. to obtain the low-expansion borosilicate transparent glaze.

5 Claims, 3 Drawing Sheets

(56) References Cited

FOREIGN PATENT DOCUMENTS

| | | |
|---|---|---|
| CN | 102503122 | 6/2012 |
| CN | 106687422 | 5/2017 |
| CN | 113336438 | 9/2021 |

* cited by examiner

LOW-EXPANSION BOROSILICATE TRANSPARENT GLAZE AND A PREPARATION METHOD AND USE THEREOF

This is a U.S. national stage application of PCT Application No. PCT/CN2022/141919 under 35 U.S.C. 371, filed Dec. 26, 2022 in Chinese, claiming priority of Chinese Application No. 202210034882.8, Jan. 13, 2022, all of which are hereby incorporated by reference.

TECHNICAL FILED

The present invention relates to the technical field of glass, in particular a low-expansion borosilicate transparent glaze and a preparation method and use thereof.

BACKGROUND OF TECHNOLOGY

Nowadays, glaze has been more often used as decorative goods to enhance the aesthetic appeal of a wall surface, for example, the specification of patent publication No. CN213654057U disclosed a glaze decorative background wall, and the specification of patent publication No. CN214941562U disclosed a glaze brick and a glaze brick wall.

There exists a larger difference in the environment conditions for glaze to face when used as exterior wall decoration and indoor ornaments. The glaze used for the exterior wall decoration is subject to disadvantageous factors such as sun and rain exposure, changes of temperature and humidity, and so on, which requires that the glaze material used for the exterior wall decoration needs good chemical stability such as water tolerance, acid- and base-tolerance and temperature- and humidity-tolerance, etc.

Traditional glaze melts at a temperature below 1400° C., has chemical composition with a sum of PbO, $Na_2O$, and $K_2O$ mass percent contents larger than 30%, and has a secondary fusion-cast molding temperature below 900° C. when a product of desired shape and construction is prepared.

The traditional glaze material has an average linear thermal expansion coefficient of $(90-110) \times 10^{-6}$/° C. within a range of 20-300° C., chemical stability of Grade 5, and its product has poorer chemical stability and water tolerance and acid- and base-tolerance, and has no problem to be used for indoor ornaments, but produces problems such as breakage, erosion, etc., if used for outdoors (e.g., exterior wall decoration, etc.) due to susceptibility to an environment such as temperature, humidity, acidity and basicity, etc.

Borosilicate glass has better chemical stability, and good performance in terms of heat tolerance, fireproof, acid- and base-tolerance, humidity tolerance, etc., and is a more ideal candidate useful for exterior wall decoration glaze, but its main problem lies in easy phase separation mainly because $[BO_3]$ and $[SiO_4]$ are immiscible and form a silica-rich phase and a sodium- and boron-rich phase after further aggregation.

The formation of glass is a result of rapid cooling of the melt. From the viewpoint of crystallization kinetics of glass, the growth interval temperature of the crystal nucleus is lower than that of the crystal, a glass melt cooling from a high temperature, first arriving at the crystal growth interval, and then the crystal nucleus formation interval, and this process is opposite to the growth process of crystal in glass, and is favourable to the formation of glass. If glass undergoes the secondary fusion-cast, from a low temperature to a high temperature, it needs to go through the crystal nucleus formation interval and then the crystal growth interval of glass, and this process conforms to the growth regularity of crystal and favors production of crystallization.

Therefore, in fusion-cast molding, the glaze blank needs to rapidly pass through a crystallization region, reaching a molding temperature, after molding, then rapidly pass through a crystallization region, and get into an annealing temperature interval.

During the experiment, it can be apparently observed that during the secondary fusion-cast a sample of boron-silicon formulation of prior art shows on surface apparent white phase separation substances, and meanwhile at the junction of glaze blank there are also apparent split-joint traces. This phenomenon destroys the integrity of the glaze casting, and can seriously influence the mechanical performance and chemical stability of the glaze casting.

SUMMARY OF THE INVENTION

With the above-mentioned technical problem and shortcomings existing in the field in mind, the present invention provides a low-expansion borosilicate transparent glaze, which has a secondary fusion-cast molding temperature of 1100-1200° C., and is rapidly transferred to an annealing lehr after molding to anneal according to an annealing temperature curve without phase separation, and is particularly suitable for the manufacture and production of outdoor glaze.

A low-expansion borosilicate transparent glaze has raw material composition by mass percentage including:
$SiO_2$ 72%~80%,
$B_2O_3$ 4%~12%,
$Na_2O$ 4%~12%,
CaO 0.1%~4%,
$Al_2O_3$ 0.1%~6%,
$Fe_2O_3$ 0~0.05%,
MgO 0~2%,
$K_2O$ 0~2%,
ZnO 0~2%,
BaO 0~2%,
$ZrO_2$ 0~2%,
$Li_2O$ 0~0.5%, and
$TiO_2$ 0~0.5%;
wherein a sum of the mass percentages of $SiO_2$, $B_2O_3$, $Al_2O_3$ is 85%-95%.

In a preferred embodiment of the low-expansion borosilicate transparent glaze, in the raw material composition, a mass percent content of ZnO is 0.5-1%.

The low-expansion borosilicate transparent glaze of the present invention has an elastic modulus more than 72 GPa, an average linear thermal expansion coefficient of $(50-60) \times 10^{-6}$/° C. within a range of 20-300° C., and chemical stability of Grade 1.

The present invention also provides a preparation method of the low-expansion borosilicate transparent glaze, which includes steps of:
(1) after mixing dried raw materials, melting at 1400-1540° C. to obtain a high-temperature glass melt;
(2) cooling the high-temperature glass melt to 1150-1230° C. to mold; and
(3) annealing the molded glass at 530-600° C. to obtain the low-expansion borosilicate transparent glaze.

In a preferred embodiment of the preparation method of the low-expansion borosilicate transparent glaze, in step (1), time for the melting is 10-25 hours.

The present invention also provides use of the low-expansion borosilicate transparent glaze in preparation of a glaze product by secondary fusion-cast molding, wherein a temperature of the secondary fusion-cast molding is 1100-1200° C.

As a single general inventive concept, the present invention also provides a preparation method of a glaze product, which includes: putting the low-expansion borosilicate transparent glaze within a mould to undergo secondary fusion-cast molding at 1100-1200° C., and then annealing to obtain a glaze product.

In a preferred embodiment of the preparation method of the glaze product, a holding time at 1100-1200° C. is 25-35 minutes, and then within 60 minutes the temperature is lowered to an annealing temperature of 590-610° C., and is held at this temperature for 15-25 minutes, then lowered to 490-510° C. at 1-2° C./minute, and finally lowered to 35-45° C. at 3-5° C./minute to obtain the glaze product.

In a preferred embodiment of the preparation method of the glaze product, the temperature is raised to 1100-1200° C. at 5-10° C./minute.

The present invention also provides a glaze product prepared by the above preparation method. The glaze product has a smooth and limpid surface and an even internal texture without any trace of split-joint.

The present invention also provides use of the glaze product in outdoor decoration such as exterior wall decoration.

Compared with prior art, the present invention has main advantages including:

The low-expansion borosilicate transparent glaze of the present invention has an elastic modulus more than 72 GPa, an average linear thermal expansion coefficient of $(50\text{-}60)\times10^{-6}/°$ C. within a range of 20-300° C., and chemical stability of Grade 1, which has a secondary fusion-cast molding temperature of 1100-1200° C., and is rapidly transferred to an annealing lehr after molding to anneal according to an annealing temperature curve without phase separation, and is particularly suitable for the manufacture and production of outdoor glaze.

DETAILED DESCRIPTION OF EMBODIMENTS

The present invention will be further explained below in combination with figures and specific examples. It should be understood that these examples are only intended to describe the present invention instead of limiting the scope of the present invention. In the following examples, an operation method without indicating specific conditions is usually according to normal conditions or conditions recommended by manufacturers.

Testing Standards:
Elastic modulus: JC/T678678-1997 Test method for elastic modulus, shear modulus and Poisson ratio of glass material;
Linear thermal expansion coefficient: JC/T679-1997 Test method for average linear thermal expansion coefficient of glass; and
Chemical stability: GB/T 6584-1997 Particle test method and grading of water tolerance of glass at 98° C.

Example 1

The raw material composition by mass percentage of the low-expansion borosilicate transparent glaze of the present example is: $SiO_2$: 76.1%, $B_2O_3$: 9%, $Na_2O$: 9%, CaO: 0.1%, $Al_2O_3$: 3.3%, ZnO: 0.5%, $ZrO_2$: 1.97%, $Fe_2O_3$: 0.03%.

The preparation method was performed by the following steps:
(1) after mixing dried raw materials in proportion, melting at 1520° C. for 10 hours to obtain a high-temperature glass melt;
(2) cooling the high-temperature glass melt to 1150° C. to mold;
(3) annealing the molded glass at 595° C.;
(4) cutting;
(5) testing;
(6) packing; and
(7) entering into storage to obtain the low-expansion borosilicate transparent glaze.

Figure 1:
FIG. 1 is a physical photograph of the low-expansion borosilicate transparent glaze of Example 1.

The above-mentioned low-expansion borosilicate transparent glaze as shown in FIG. 1 has an elastic modulus of 75 GPa, a linear thermal expansion coefficient (20-300° C.) of $53\times10^{-6}/°$ C., and chemical stability of Grade 1.

Figure 3:
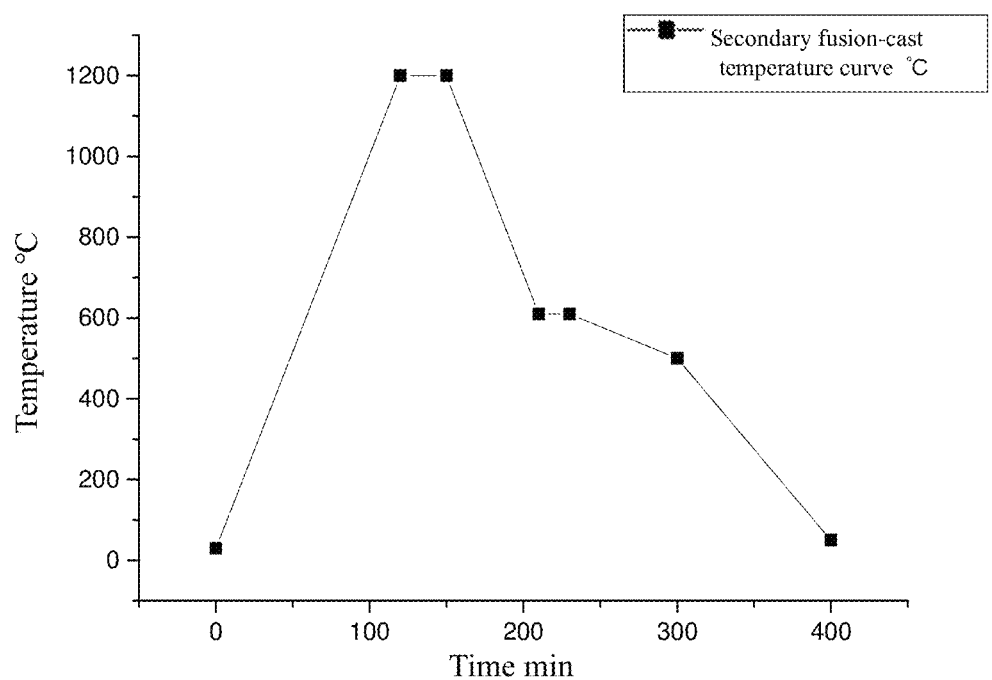
FIG. 3 is a temperature graph of a preparation process of the glaze product of Example 1.

The above-mentioned low-expansion borosilicate transparent glaze was used to prepare a glaze product by: putting the low-expansion borosilicate transparent glaze material lumps within a high-temperature mould, putting into a high-temperature furnace to raise the temperature to 1200° C. at 10° C./minute, holding for 30 minutes, then rapidly transferring into an annealing furnace, keeping the glass and mould within the furnace for 60 minutes to lower the temperature to an annealing temperature 600° C., and holding at this temperature for 20 minutes, then in 70 minutes lowering the temperature to 500° C., and finally in 100 minutes cooling to 40° C., with the temperature curve shown in FIG. 3.

Figure 2:
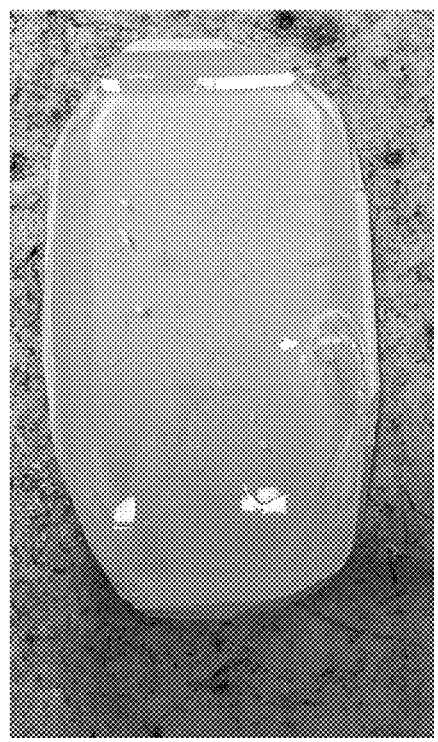
FIG. 2 is a physical photograph of the glaze product of Example 1.

As shown in FIG. 2, the obtained glaze product has a smooth and limpid surface and an even internal texture without any trace of split-joint.

Example 2

The raw material composition by mass percentage of the low-expansion borosilicate transparent glaze of the present example is:
$SiO_2$: 75.1%, $B_2O_3$: 10%, $Na_2O$: 6.7%, CaO: 1.0%, BaO: 1.93%, $Al_2O_3$: 3.5%, $K_2O$: 1.0%, ZnO: 0.64%, $Li_2O$: 0.1%, $Fe_2O_3$: 0.03%.

The preparation method was performed by the following steps:
(1) after mixing dried raw materials in proportion, melting at 1530° C. for 10 hours to obtain a high-temperature glass melt;
(2) cooling the high-temperature glass melt to 1200° C. to mold;
(3) annealing the molded glass at 593° C.;
(4) cutting;

(5) testing;
(6) packing; and
(7) entering into storage to obtain the low-expansion borosilicate transparent glaze.

The above-mentioned low-expansion borosilicate transparent glaze has an elastic modulus of 74 GPa, a linear thermal expansion coefficient (20-300° C.) of $55\times10^{-6}/°$ C., and chemical stability of Grade 1.

The above-mentioned low-expansion borosilicate transparent glaze was used to prepare a glaze product by: putting the low-expansion borosilicate transparent glaze material lumps within a high-temperature mould, putting into a high-temperature furnace to raise the temperature to 1180° C. at 10° C./minute, holding for 30 minutes, then rapidly transferring into an annealing furnace, keeping the glass and mould within the furnace for 30 minutes to lower the temperature to an annealing temperature 600° C., and holding at this temperature for 20 minutes, then lowering the temperature to 500° C. at 1.5° C./minute, and finally cooling to 40° C. at 4° C./minute.

The obtained glaze product has a smooth and limpid surface and an even internal texture without any trace of split-joint.

Table 1 below shows the raw material composition of the borosilicate transparent glaze of Comparison Example 1, Comparison Example 2, Example 3.

TABLE 1

| Ingredients (w.t. %) | Comparison Example 1 | Comparison Example 2 | EXAMPLE 3 |
|---|---|---|---|
| $B_2O_3$ | 11 | 9.14 | 9.10 |
| $SiO_2$ | 68.3 | 72.77 | 77.30 |
| $Al_2O_3$ | 2.5 | 1.95 | 3.39 |
| $Na_2O$ | 8.6 | 6.67 | 5.00 |
| $K_2O$ | 1.45 | 1.26 | 0.65 |
| CaO | 3 | 3.04 | 0.20 |
| MgO | 1.9 | 1.9 | 1.09 |
| $Li_2O$ | 0.15 | 0.17 | 0.17 |
| $TiO_2$ | 0.1 | 0.1 | 0.1 |
| ZnO | 1 | 1 | 1 |
| BaO | 2 | 2 | 2 |

The preparation methods of the borosilicate transparent glaze of Comparison Example 1, Comparison Example 2, Example 3 were performed by the following steps:
(1) after mixing dried raw materials in proportion, melting at 1530° C. for 12 hours to obtain a high-temperature glass melt;
(2) cooling the high-temperature glass melt to 1210° C. to mold;
(3) annealing the molded glass at 593° C.;
(4) cutting;
(5) testing;
(6) packing; and
(7) entering into storage to obtain the low-expansion borosilicate transparent glaze.

The borosilicate transparent glaze of Comparison Example 1, Comparison Example 2, Example 3 has an elastic modulus of 75, 74, 76 GPa respectively, a linear thermal expansion coefficient (20-300° C.) of $53\times10^{-6}/°$ C., $54\times10^{-6}/°$ C., $52\times10^{-6}/°$ C. respectively, and chemical stability of Grade 1 for all.

Figure 4:
FIG. 4 is a physical photograph of the glaze product of Comparison Example 1.
Figure 5:
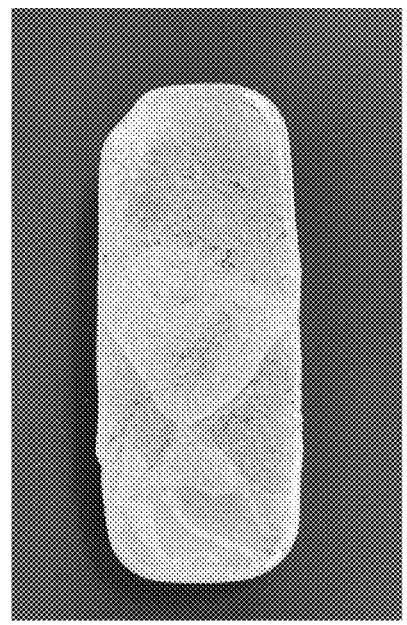
FIG. 5 is a physical photograph of the glaze product of Comparison Example 2.
Figure 6:
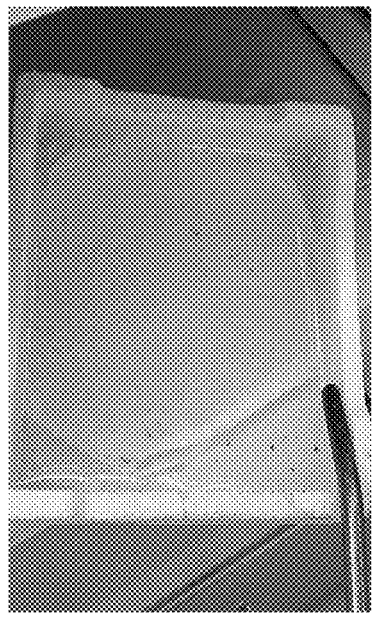
FIG. 6 is a physical photograph of the glaze product of Example 3.

The above-mentioned borosilicate transparent glaze of Comparison Example 1, Comparison Example 2, Example 3 was used respectively to prepare a glaze product by: putting the borosilicate transparent glaze material lumps within a high-temperature mould, putting into a high-temperature furnace to raise the temperature to 1180° C. at 10° C./minute, holding for 30 minutes, then rapidly transferring into an annealing furnace, keeping the glass and mould within the furnace for 30 minutes to lower the temperature to an annealing temperature 600° C., and holding at this temperature for 20 minutes, then lowering the temperature to 500° C. at 1.5° C./minute, and finally cooling to 40° C. at 4° C./minute, thus to obtain the glaze products as shown in FIG. 4, FIG. 5, FIG. 6 respectively.

It was clear that the glaze products prepared from the borosilicate transparent glaze of Comparison Example 1, Comparison Example 2 showed white scale-shaped substances on surface, and apparent internal split-joint traces. The glaze product prepared from the borosilicate transparent glaze of Example 3 has a smooth and limpid surface and an even internal texture without any trace of split-joint.

Furthermore, it should be understood that after reading the contents of the present invention as described above, those of skill in the art can make various changes and modifications to the present invention, and such equivalents are also deemed to be within the scope of the present application as defined by the appended claims.

What is claimed is:

1. A preparation method of a glaze product, characterized in comprising the following steps:
    putting a low-expansion borosilicate transparent glaze within a mould to undergo secondary fusion-cast molding at 1100-1200° C., and then annealing to obtain the glaze product;
    maintaining the secondary fusion-cast molding temperature at 1100-1200° C. for 25-35 minutes, then, within 60 minutes thereafter, lowering temperature to an annealing temperature of 590-610° C., and maintaining the annealing temperature for 15-25 minutes, then lowering temperature to 490-510° C. at a rate of 1-2° C./minute, and finally lowering temperature to 35-45° C. at a rate of 3-5° C./minutes to obtain the glaze product;
    wherein the glaze product has a surface and a texture without any trace of split-joint;
    wherein the low-expansion borosilicate transparent glaze's raw materials composition by mass percentage comprises:
    $SiO_2$ 72%-80%,
    $B_2O_3$ 4%-12%,
    $Na_2O$ 4%-12%,
    CaO 0.1%-4%,
    $Al_2O_3$ 0.1%-6%,
    $Fe_2O_3$ 0-0.05%,
    MgO 0-2%,
    $K_2O$ 0-2%,
    ZnO 0-2%,
    BaO 0-2%,
    $ZrO_2$ 0-2%,
    $Li_2O$ 0-0.5%, and
    $TiO_2$ 0~0.5%;
    wherein a sum of mass percentages of $SiO_2$, $B_2O_3$ and $Al_2O_3$ is 85%-95%; and
    wherein the low-expansion borosilicate transparent glaze has an average linear thermal expansion coefficient of $(50-60)\times10^{-6}/°$ C. within a range of 20-300° C.

2. The method according to claim 1, wherein the low-expansion borosilicate transparent glaze further comprises ZnO with a mass percent content ranging from 0.5-1%.

3. The method according to claim 1, wherein the low-expansion borosilicate transparent glaze is prepared by the following steps:

(1) after mixing dried raw materials, melting the dried raw materials at 1400-1540° C. to obtain a high-temperature glass melt;
(2) cooling the high-temperature glass melt to 1150-1230° C. to mold; and
(3) annealing the molded glass at 530-600° C. to obtain the low-expansion borosilicate transparent glaze.

4. The preparation method according to claim 3, characterized in that in step (1), time for the melting is 10-25 hours.

5. A glaze product prepared by the preparation method according to claim 1.

* * * * *